Sept. 9, 1952 W. R. PETERSON 2,610,020
BAG WEIGHING AND FILLING MACHINE
Filed Aug. 17, 1946 4 Sheets-Sheet 1

Fig. 1

INVENTOR.
WILLIAM R. PETERSON.
BY
Ward, Crosby & Neal
ATTORNEYS.

Sept. 9, 1952 W. R. PETERSON 2,610,020
BAG WEIGHING AND FILLING MACHINE
Filed Aug. 17, 1946 4 Sheets-Sheet 4

INVENTOR.
WILLIAM R. PETERSON
BY
Ward, Crosby & Neal
ATTORNEYS.

Patented Sept. 9, 1952

2,610,020

UNITED STATES PATENT OFFICE 2,610,020

BAG WEIGHING AND FILLING MACHINE

William R. Peterson, Oswego, N. Y., assignor to St. Regis Paper Company, New York, N. Y., a corporation of New York Application August 17, 1946, Serial No. 691,323

15 Claims. (Cl. 249—60)

This invention relates to apparatus for filling and weighing containers, and more particularly to apparatus for automatically filling, weighing and ejecting valve bags.

This application was co-pending with my application Serial No. 451,883, now Patent No. 2,408,225, disclosing an alternative embodiment of the present invention. Said latter application in turn was co-pending with my application Serial No. 361,609, now Patent No. 2,350,529, which discloses another alternative embodiment of the present invention.

Apparatus heretofore employed for automatically and rapidly filling and accurately weighing valve bags has required a plurality of complicated means for actuating same, and in many instances a plurality of power sources and control devices therefor including expensive and complicated timing and coordinating apparatus.

Said apparatus previously proposed has in many instances been difficult to operate, tedious of adjustment, and irresponsive to delicate adjustment of weights and timed periods. Also the high initial expense and high operating costs of many prior automatic valve bag fillers has rendered same unprofitable and uneconomical.

Furthermore, the speed and positive action of many bag weighing and filling machines previously employed has left much to be desired whereby the number of bags per hour filled and weighed has been less than desirable and less than necessary for economical operation.

Also, in bag weighing and filling machines wherein suction is employed adjacent the inner extremity of a filling tube for removing dust-laden air which is puffed from the bag due to "back pressure" therein, the suction apparatus has not had a sufficient opportunity to remove all of the so-called "blow back" or puff because said inner tube extremity normally does not move fully out of register with a filling orifice therefor. Consequently, the suction cannot act with full effect to carry away whatever material is puffed through the bag valve under said back pressure.

According to the present invention, novel apparatus is provided for eliminating the above difficulties whereby all of the many operations (except a manual initiating operation) of an automatic bag weighing and filling device are powered and controlled by an integral unit, preferably hydraulic, which is simple to operate, positive in action, of high sensitivity to adjustment, and which is simple and inexpensive in construction.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the equipment herein disclosed.

Referring to the drawings in further detail, the novel apparatus is constituted broadly by a weighing device, a spout mounted on the weighing device having suitable bag support means for holding a valve bag in filling relation to the spout, and means for controlling the flow of material to the spout and for discharging the bag from the apparatus a predetermined interval after the filling thereof. The filling spout in the form shown assumes three separate positions. In the first position it is in register with a filling throat in communication with a suitable hopper during the filling operation; in the second position the inlet orifice of the spout is partially out of register with said throat member as a result of weighing movement of the weighing device wherein a filled bag is balanced against a predetermined weight of the weighing device; in the third position the spout is moved completely out of register with said throat member in order that a suction chamber which surrounds the inlet orifice of the spout may be given full effect to carry away any puff of dust-laden air which is blown back through the spout as a result of back pressure in the bag. A hydraulic power apparatus is provided for initiating the flow of material to said spout, for moving same from the second position thereof to the third position, and for discharging the bag. Suitable means are operatively associated with the apparatus for shutting off said flow of material to the bag in response to weighing movement of the weighing device and for initiating that portion of the operation of the hydraulic power means wherein, as above pointed out, the spout is moved out of register with said throat member and the bag is discharged.

Figure 2:
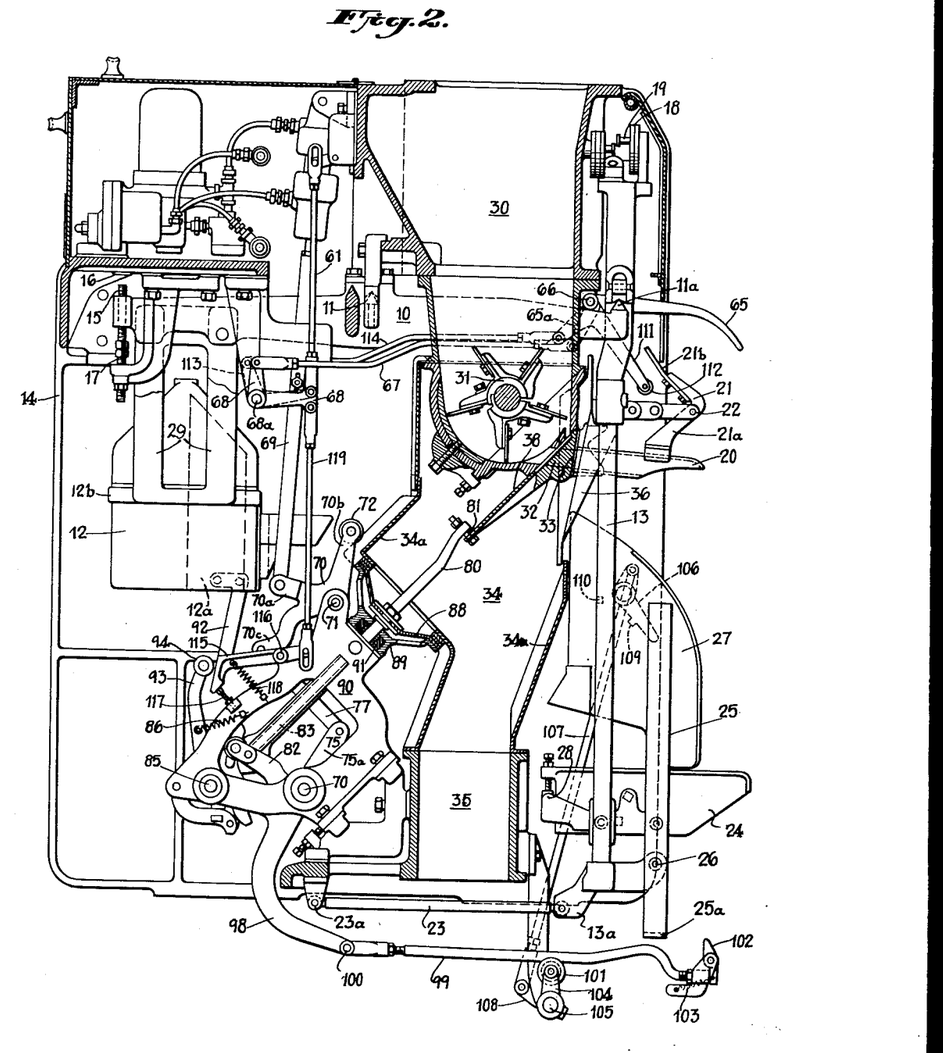
Fig. 2 is a side elevation partly in section and with parts broken away of the embodiment shown in Fig. 1.

In the form shown in Fig. 2, the weighing device comprises a scale beam 10 of conventional design resting upon a centrally disposed knife edge 11 and having suspended at one extremity thereof a suitable weight 12 and at the opposite extremity a bag frame 13. The entire apparatus may be mounted in a suitable fixed housing or frame 14. Suitable means of well known type are associated with the weighted end of the scale beam for limiting the displacement thereof comprising, for example, a limit stop adjustment screw 15 (Fig. 2) mounted upon said weighted end which is adapted for cooperating with an upper fixed limit stop 16 and an adjustable lower limit screw 17, the latter also being fixedly mounted upon the housing or frame 14.

The bag frame 13 may rest on suitable knife edges as at 11a upon the load end of said scale beam and in order to facilitate a fine weight adjustment, there may be associated with, for example, an upper portion of said bag frame, a group of removable transfer weights 18. Each of these weights may have a mass of, for example, ¼ of a pound and may rest upon an arm member 19 of the bag frame.

Figure 3:
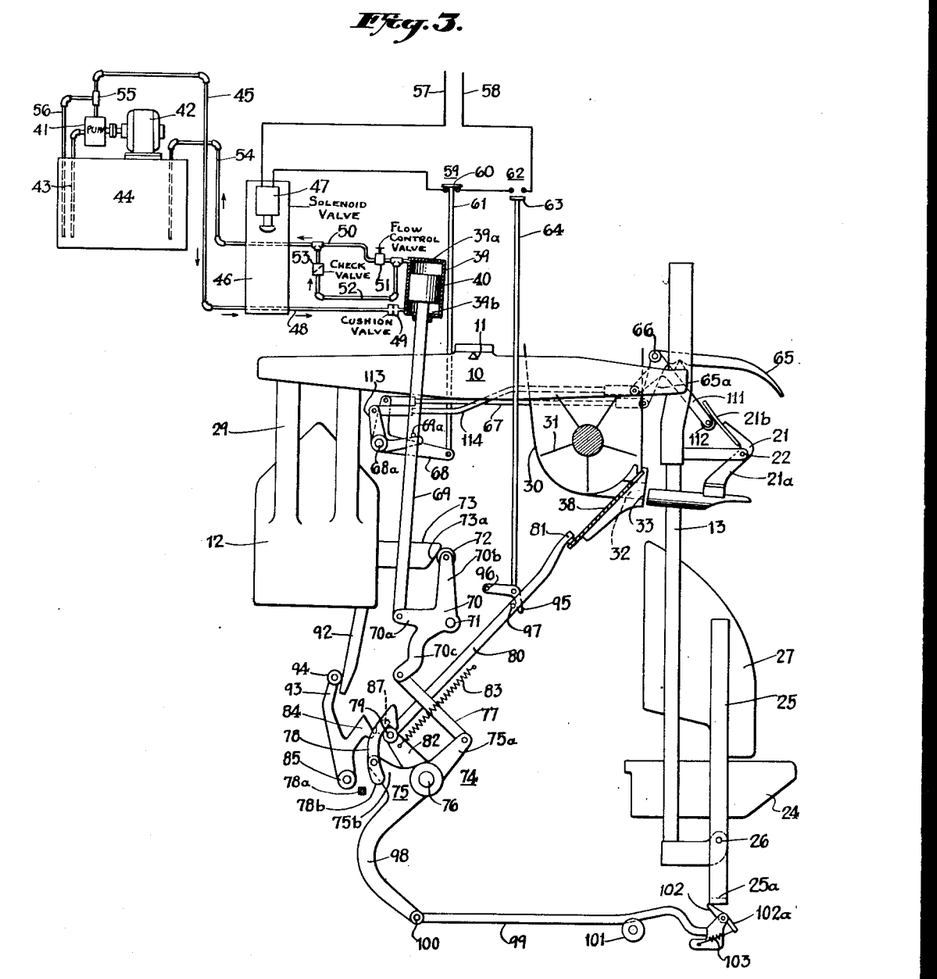
Figs. 3, 4, 5 and 6 are schematic representations of the invention with the parts thereof in different operating positions.

Mounted upon the bag frame and adapted for weighing movement therewith is a suitable bag filling spout 20 which may be mounted beneath a suitable bag clamp 21 which, for example, is in pivotal association with the bag frame by means of pivot 22. The clamp 21, in the form shown, consists of a weighted lower arm 21a to which a clamping surface is attached and a cam surface 21b which, in a manner to appear hereinafter, in cooperation with a lifting roller is adapted for angularly shifting the bag clamp to an open position. Normally, the bag clamp rests in a clamping position under the influence of gravity as shown in Figs. 2 and 3.

Suitable means are provided for holding the bag frame 13 in a vertical position at all times, for example, during the period of its weighing movement, comprising a restraining arm 23 (Fig. 2) which is pivotally connected to a foot 13a of the bag frame at one extremity thereof and is pivotally connected to the housing 14 at 23a.

A bag saddle which may be of well known design is associated with the bag frame comprising a support member 24 which may be rigidly connected to a saddle pivot arm 25. The latter is pivotally connected to the bag frame at 26, and adapted for angular movement thereabout in response to a discharge device to be described hereinafter.

Also rigidly connected to said saddle pivot arm 25 is a conventional bag support shield 27 which facilitates the discharge of the bag by engaging a side portion thereof. The shield member 27 and bag saddle 24 are mounted in such a manner that the center of gravity thereof is to the left of the pivot 26 as viewed in Fig. 2, thus causing gravity to urge the bag saddle in a counter-clockwise direction against a suitable limit stop 28 which maintains the bag saddle normally in its horizontal or untilted position. Suitable means (not shown) may be provided for elevating or lowering the bag saddle to adjust same to hold a variety of sizes of valve bags in filling relationship with the spout 20.

In order to provide for a wider adjustment of weight for the weighing device over and above the slight adjustment provided by the removable weights 18, the weight 12 may be constructed with a hollow portion as at 12a. Such hollow portion is formed eccentrically or "off center" relative to the vertical axis of the weight 12 as illustrated in Fig. 2. A suitable annular flange 12b is preferably provided near the mid portion of the weight which is adapted for engaging retaining shoulders upon suspension arms 29, the latter being rigidly attached to the weight end of the scale beam. By angularly shifting or turning the weight 12 as carried by its retaining shoulders, about its vertical axis as viewed in Fig. 2, the center of gravity thereof may be shifted, thereby effecting a wide weight adjustment of the scale means.

Means are provided for feeding material to the spout and into the bag comprising, in the form shown, a hopper 30 having a rotatable impeller 31 at the lower portion thereof which is adapted for forcing, preferably at high velocity, material through a throat member 32 having an outlet orifice 33. Impeller 31 is rotated by suitable power means (not shown).

The inlet orifice of the spout 20 and the outlet orifice 33 of the throat member 32 are normally in register and thus adapted for a bag filling relationship prior to a weighing movement of the frame member. The relative positions of the above mentioned two orifices may be adjusted prior to weighing by means of said adjustment screws 15 and 17.

Surrounding the throat member and the inner extremity of the spout 20 is a suction chamber 34 having suitable fixed walls 34a which are in communication by means of a channel 35 with suitable suction means (not shown). Cooperating with the fixed walls 34a is a movable portion 36 of said chamber 34 which constitutes a shield through which extends the spout 20. The movable shield 36 is mounted upon the bag frame 13 and is, of course, shiftable therewith. The force of suction is thus exerted at all times adjacent the periphery of the hopper throat orifice 33 and the inlet orifice of the spout 20 when said orifices are in register. As the spout moves under the influence of the weight of the filled bag, the inlet orifice thereof will move partially out of register with the orifice 33. This orifice will not move completely out of register under the influence of the weight of the filled bag because, for example, the scale is of the so-called "pendulum" type and does not angularly shift abruptly a large amount from an unbalanced to a balanced condition.

Upon complete filling of the bag the spout thus moves from an initial or unbalanced position in register with the throat to a second or balanced position partially out of register with the throat. Means to be hereinafter described are provided for lifting the weight 12 after it has reached a balanced position and for urging it upwardly in order to give further downward movement to the spout whereby the inlet orifice thereof is forced fully out of register with the throat member and whereby full advantage may be taken of the suction in chamber 34 for carrying away any dust-laden material or puff which may blow back through the spout as a result of back pressure in the valve bag.

The movement of the spout from an unbalanced to a balanced position may be designated as a first stage movement to a primary or balanced position, and the further movement to a position completely out of register with the throat may be designated as a second stage movement to a secondary position. Analogous terminology may be applied to the weight 12.

Suitable means may be provided for controlling a flow of material to the spout and thus to the bag comprising, for example, a gate member 38 which may be axially shiftable to open and shut said throat member.

In order to overcome the disadvantages set forth in the beginning of this disclosure, novel unitary or integral power means are provided which are adapted for performing and governing all of the operations of the apparatus with the exception of one initiating manual operation.

Figure 6:
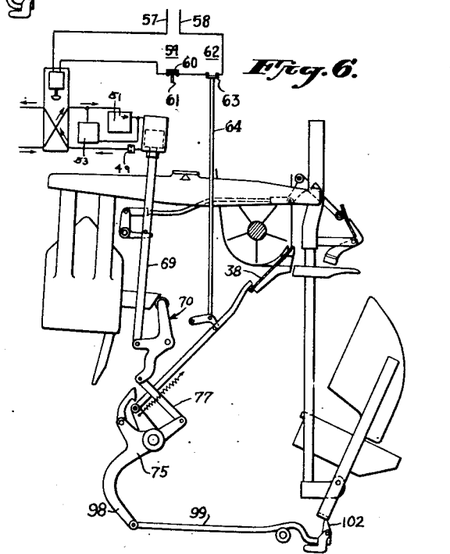

The novel unitary power means in cooperation with and through the intermediary of novel linkages is adapted for the following:

(1) At the outset of the operation of the apparatus when an empty bag is placed upon the spout 20 the latter has been urged to its secondary position as above described whereby it is completely out of register with throat 32. Thus the weight 12 is held in a lifted position at the upper limit of its motion (Fig. 6). The weight consequently must be eased into an active or lowered position in order for it to perform its normal function. The movement of the weight cannot be a sudden one without damage to the machine. Consequently, it is lowered by said power means gently and eased from its lifted position as shown in Fig. 6 to its lowered or initial position as shown in Fig. 2.

(2) During the easing of weight 12 to its lowered position, the clamp 21 is lowered, by a linkage connected to the power means, into a clamping engagement with the bag.

(3) Simultaneous with the lowering of the weight 12, the gate 38 is opened by said power means and material is fed to the bag.

(4) When the bag is filled a weighing movement of the weighing device occurs and the spout moves partially out of register with the throat. In response to this weighing movement the gate is closed and movement of the power means is initiated to lift the bag clamp, lift the weight to its upper or lifted position, as above described, and thus to move the spout fully out of register with the throat, and at a predetermined time thereafter to discharge the bag. In this condition the bag clamp is held open and the weight is held in its lifted position until another bag is put on the spout and the operation is repeated.

A novel linkage to be described hereinafter is provided for accomplishing the above under the influence of and in combination with a fluid actuatable engine, for example, a hydraulic engine (Fig. 3) comprising a cylinder 39 having a piston 40 therein adapted for a primary power stroke in one direction during which:

(1) The weight 12 is lowered and the spout is moved into register with the throat;
(2) The bag clamp 21 is lowered; and
(3) The gate 38 is opened, and a secondary power stroke in an opposite direction after the bag is filled and the gate 38 closed during which:

(1) The weight 12 is lifted and thus the spout 20 is moved out of register with the throat 32;
(2) The bag clamp 21 is lifted; and
(3) The bag is ejected after a preselected delay measured from the instant of gate closing.

The fluid pressure and fluid control means for said engine comprise, in the form shown, a pump 41 (Fig. 3) which is continually driven by an electric motor 42. The pump by means of a conduit 43 draws a suitable fluid, such as oil, from a reservoir 44 and pumps same by means of a conduit 45 to a valve block 46 where the flow is directed, for example, by a solenoid valve 47 to either an upper chamber 39a or a lower chamber 39b of the cylinder 39 as viewed in Fig. 3. The valve block 46 is in communication with the lower chamber 39b by means of a conduit 48. There may be included in said conduit a restricted orifice member or cushion valve 49, which may be adjustable if desired, and which is effective to retard the upward or primary stroke of the piston 40, for a purpose to appear hereinafter. The member 49 is variously termed as a "cushion orifice," "cushion member" or "cushion valve."

The valve block 46 is in communication with the upper chamber 39a of the cylinder by means of a conduit 50. Fluid under pressure is fed to this chamber to produce said secondary power stroke wherein the spout 20 is lowered out of register with throat 32, the bag clamp 21 is lifted, and thereafter the bag is discharged at the latter part of said stroke. In order to delay the discharge of the bag the period of this stroke is prolonged by permitting only a small flow or trickle of fluid to act upon the upper surface of the piston. This may be accomplished by a suitable adjustable flow control valve 51 in the conduit 50.

During the primary or upward stroke of the piston, it has been mentioned that it is necessary to ease the weight 12 from its lifted or uppermost position (in which it was held by the preceding secondary or downward stroke), to its lowered position as shown in Fig. 2 thereby moving the spout 20 into register with the throat 32. This is accomplished through a linkage to be described hereinafter.

This easing or cushioning may be effected by restricting the flow of fluid to the chamber 39b by means of said restricted orifice member 49. For example, said member may have a small bore of $\frac{1}{32}$ of an inch which permits such a restricted fluid flow that the piston may move only very slowly. There is a vacuum effect which assists this cushioning action by virtue of a partial vacuum in the chamber 39b which is slowly dissipated as fluid bleeds through the orifice of member 49. Sufficient atmospheric pressure will act upon the body of liquid which is in communication with the upper surface of piston 40 to accomplish said cushioning in conjunction with a linkage connected to the weight to appear hereinafter.

As above discussed the conduit 50 has a flow control valve 51 therein which normally may be adjusted to permit passage of only a trickle of fluid toward the chamber 39a. Consequently, in order to avoid interference with the primary or upward stroke, wherein fluid is exhausted from the chamber 39a, a second avenue for the flow of such exhaust fluid is provided comprising a conduit 52 which by-passes the flow control valve 51 and which has therein a conventional check valve 53 of, for example, the spring loaded ball type, which will permit a flow of exhaust fluid away from the chamber 39a in the direction of the arrow adjacent said valve but not toward the chamber 39a.

It, of course, is possible to accomplish said cushioning action by omitting the restricted orifice or cushion member 49 from the conduit 48 and inserting it or an analogous member in the conduit 52.

A suitable exhaust conduit 54 from the valve block 46 to the reservoir 44 may be provided. Also, a suitable relief valve 55 may be inserted in the conduit 45 and connected to the reservoir 44 by means of a relief exhaust conduit 56 whereby fluid is fed back to the reservoir at all times when it is not flowing to the cylinder 39 for moving the piston 40. Consequently, during the actual movement of said piston fluid will flow to the cylinder 39, but after the piston has completed its stroke the pressure of the fluid will overcome the relief valve 55 and the fluid will be returned to the reservoir through conduit 56. However, sufficient pressure will normally be maintained at all times upon the piston 40 to hold it in either of its extreme positions.

Suitable means are provided for initiating the operation of the apparatus as a whole by initiating the primary stroke of the piston 40, as above discussed, comprising means for influencing the solenoid valve control member 47 to direct fluid under pressure to the lower chamber 39b of cylinder 39. This is accomplished, for example, by interrupting an electrical power circuit for said solenoid. Such a circuit comprises, in the form shown in Figs. 3 to 6, electrical leads 57, 58 connected to a suitable source of power (not shown). A switch 59 is provided in said circuit, comprising, for example, a bar member 60 which may be lifted to open the circuit by upwardly shifting a switch arm 61. Gravity normally may urge this switch to a closed position.

A somewhat similar switch 62 is provided, for a purpose to appear later, which comprises a bar member 63 upon a switch arm 64. Gravity normally may urge this switch towards an open position as shown in Fig. 3.

Manually operable means are provided for controlling the switch 59 comprising a starting lever 65 which is pivotally mounted at 66 upon the fixed housing 14, and which extends from said housing preferably adjacent and above the spout 20.

The lever 65 is operatively connected to the switch 59 by means of a lever arm 65a rigidly attached to the lever 65, a rod 67 in pivotal connection with a bell crank lever 68, which in turn is pivotally connected to the switch arm 61. Bell crank lever 68 may be mounted upon a suitable shaft 68a.

The linkage for operatively connecting the piston 40 with said spout 20 whereby the latter is moved fully out of register with the throat 32 to expose said spout to the full effect of the suction chamber 34, comprises in the form shown, a piston rod 69 rigidly attached to the piston 40 and adapted by means of a bell crank lever 70 to thrust upwardly on the weight 12 thus lowering the spout 20 on the opposite extremity of the scale beam.

The bell crank lever 70 is mounted at 71 to a fixed pivot and is provided with three arms 70a, 70b, and 70c. Arm 70a is in pivotal connection with the piston rod 69, arm 70b has a roller 72 mounted thereon which is adapted for cooperation with a weight lift arm 73 having a beveled surface 73a for contacting the roller 72.

The arm 70c is operatively associated with the gate opening and bag discharging linkages to appear later.

The same linkage which lifts the weight, as above described, also holds the weight in its lifted or upper position until eased or lowered gently as will appear hereinafter.

The piston 40 is operatively connected with the gate 38, for opening same and holding it in an opened or cocked position, for example, by means of a hook and bell crank lever arrangement 74, comprising a bell crank lever 75 pivotally mount-ed upon shaft 76 and having an arm 75a thereof operatively connected to arm 70c of lever 70 by means of a link 77. A cocking hook 78 is pivotally mounted to a second arm 75b of lever 75 and yieldingly urged against a limit stop by suitable spring means (not shown) which hold the hook in position to engage a roller 79 mounted upon an axially shiftable gate control rod 80. The latter is connected by a suitable joint at 81 to the gate 38 and is preferably pivotally mounted at the lower extremity thereof to a guide arm 82 which is angularly shiftable about the shaft 76.

After the cocking hook 78 has pulled the rod to a cocked or latched position, it is disengaged from roller 79 under the action of a stop 78a which contacts a depending portion 78b of hook 78 causing it to be moved free of roller 79.

The gate 38 may be normally urged toward a closed position, for example, by means of a spring 83 which is attached to the guide arm 82 and which urges the latter in a clockwise direction as viewed in Fig. 3.

Suitable latching means for the gate are provided whereby the gate may be cocked or latched in an open position, comprising a latch member 84 (Fig. 3) pivotally mounted at 85 and yieldingly held in an adjusted position against a limit stop (not shown), for example, by a spring 86 (Fig. 2). Latch 84 is adapted for engaging and holding a latch roller 87 which may be mounted upon the guide arm 82 whereby the gate 38 is latched in an open position.

As shown in Fig. 2 the gate control rod 80 passes into the suction chamber 34 in order to reach the gate 38. In order to assist in preserving the vacuum and in order to prevent dust-laden air from escaping from the chamber 34 a yieldable or resilient diaphragm 88 may surround the rod 80 and be tightly held at its periphery by a suitable joint in the wall 34a of said chamber. Thus axial movement of the rod 80 is not impeded.

A suitable journal 89 for rod 80 is provided in a linkage support frame 90 (Fig. 2).

In order to cushion the shock of the closing of gate 38 under the influence of spring 83 a spring cushion 91 (Fig. 2) may surround rod 80 within the journal 89 and a suitable limit stop or collar (not shown) may be adjusted to strike the spring cushion when the gate is moved to a closed position.

In order to close the gate 38 after a predetermined weight of material has been fed to the bag through spout 20, means are provided for unlatching and releasing the gate control rod from its cocked position in response to weighing movement of the weight 12. This may comprise a release weight arm 92 which is adapted for operative association with the latch 84 by means of a latch release arm or trip arm 93 which preferably is integral with the latch 84 and which is provided with a trip roller 94 for contacting the release weight arm 92 when the latter moves upward as viewed in the figures under the influence of the weight of the bag.

Means are provided for controlling the switch member 62 in such a manner that the circuit of the solenoid valve 47 is maintained open after the initial depression of hand lever 65 and during the filling of the bag, whereby said primary stroke of piston 40 may occur uninterruptedly. These means coincidentally act to close said circuit in response to said weighing movement thereby initiating the secondary stroke of the piston 40 to lower the tube 20, lift the bag clamp and discharge the bag. The above means comprise, in the form shown, an operative association of the switch arm 64 with the gate control rod 80. This is accomplished by a lever 95 angularly shiftable about a pivot at 96 and pivotally connected to the rod 64. The lever 95 cooperates with a pin 97 (Fig. 3) on the rod 80 whereby switch 62 is closed when the gate 38 is closed and is opened when the gate is opened.

As above described, the secondary stroke of the piston 40 is adapted for discharging the bag. The operative interconnection of the piston 40 and a bag discharge device is effected by means of a discharge arm 98 which preferably is integral with the bell crank lever 75 and which may axially shift an ejector or discharge rod 99 pivoted thereto at 100 and movable in a grooved support wheel 101.

At the extremity of the discharge rod is a spring loaded discharge finger 102 pivotally mounted thereupon and yieldingly urged against a limit stop by a spring 103. An extension 102a of finger 102 is connected to said spring 103 at the outer extremity of such extension. The finger is adapted for engaging the bag saddle, for example, by means of a depending portion 25a of the saddle support arm 25, and to tilt the saddle 24 and shield 27 in a clockwise direction as viewed in Fig. 6. When the finger has been moved to the left of the portion 25a and is thereafter urged to the right as viewed in Fig. 3 the finger yieldingly clears the portion 25a and thereafter snaps back into an operative position as shown in Fig. 2.

Figure 1:
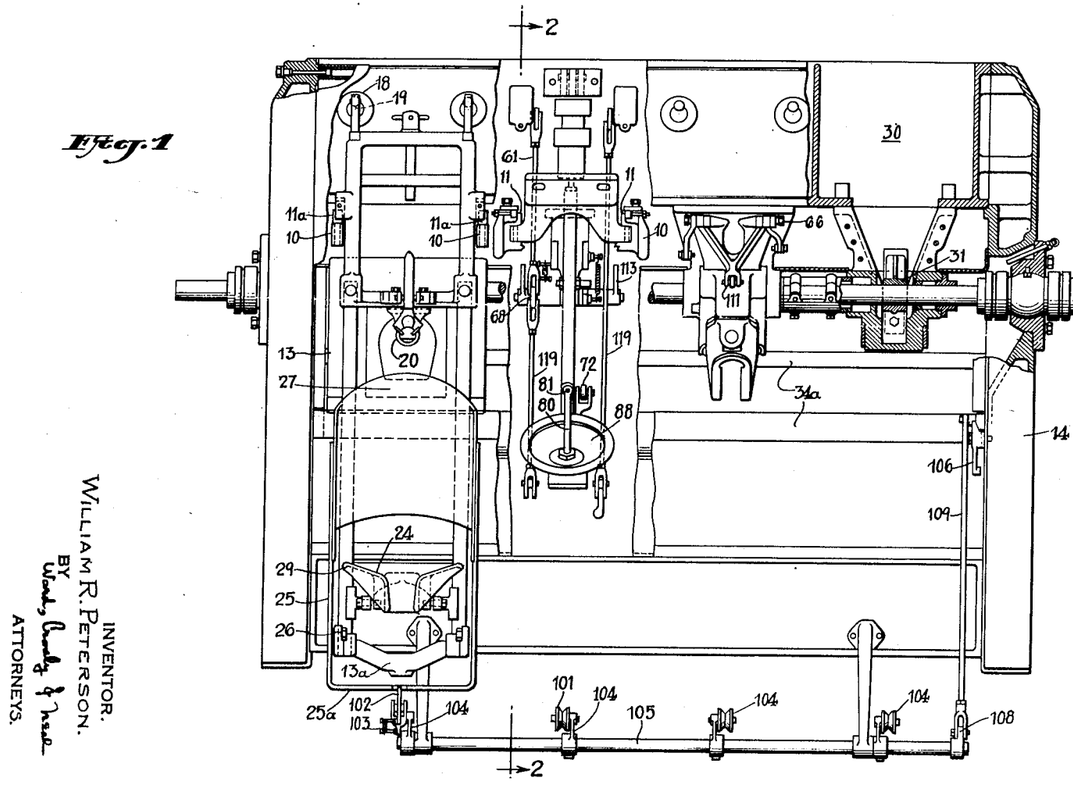
Fig. 1 is a front elevation partly in section and with parts broken away of one embodiment of the invention.

It may be desirable to render inoperative one or more discharge rods, because, for example, where a plurality of machine units of this type are operating side by side, as shown in Fig. 1, and where a single conveyor belt is employed for moving away discharged bags from all of these units, it is possible for one unit to discharge one bag on top of another bag from another unit. Means are provided for rendering inoperative any individual discharge rod comprising (Fig. 2), for example, a device for lowering the finger 102 so that its path is below member 25a. The roller 101 may be mounted upon an arm 104 attached to a shaft 105 which may be angularly shifted by a hand lever 106 interconnected to shaft 105 by means of a rod 107 and a rocking arm 108. Suitable limit stops 109, 110 may be provided for lever 106.

The bag clamp 21 is in operative association with the linkage above described and thus with the power unit by means of a bag clamp bell crank lever 111 pivoted preferably at 66 and provided with a roller 112 on one arm thereof adapted for contacting the clamp cam surface 21b. Bell crank lever 111 is angularly shifted in response to movement of the piston rod 69 through the intermediary of a linkage consisting of a second bell crank lever 113 which is connected to lever 111 by a rod 114. Bell crank lever 111 may be angularly shiftable about shaft 68a.

A pin 69a (Fig. 3) on the piston rod 69 cooperates with bell crank lever 113 to shift the latter in a clockwise direction on a down or secondary stroke whereby the bag clamp 21 is lifted.

Occasionally emergencies arise in the course of the operation of the machine, for example, a bag may break during the filling thereof making it necessary immediately to stop the filling operation and to discharge the bag. Normally the cessation of material flow to the bag and the discharge thereof is initiated automatically by weighing movement of the weighing device. Manually operable means are provided for accomplishing the same result as said weighing movement comprising a linkage for tripping the latch 84 in response to an upward thrust of the handle 65. A portion of this linkage is common to the linkage for opening switch 59, described above, and is constituted by a rocker arm 115 (Fig. 2) which is normally urged about a pivot 116 to an inactive position against an adjustable limit stop 117 by a spring 118, and positioned to contact the latch trip roller 94. A rod 119 interconnects an extremity of rocker arm 115 to the bell crank lever 68 whereby an upward pull of hand lever 65 is communicated to rocker arm 115 to rotate same in a clockwise direction, as viewed in Fig. 2, to contact trip roller 94 thereby tripping latch 84 (Fig. 3) causing gate 38 to close and initiating the discharge of the bag.

Figure 4:
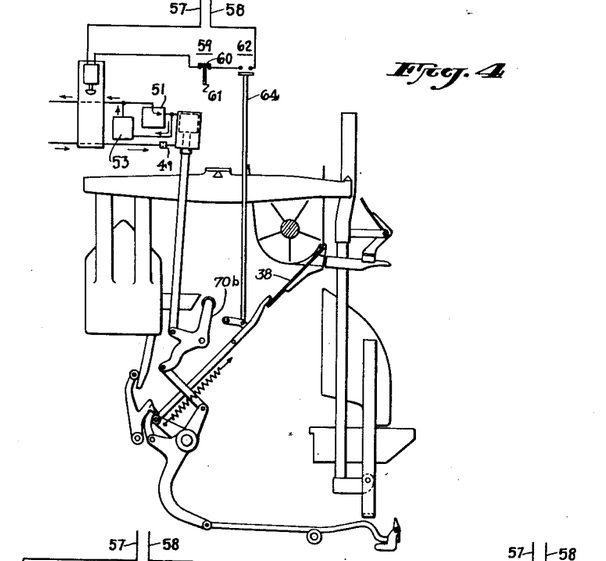

In operation, the various stages may be described as follows:

(a) Gate opening stage—empty bag is applied and operation initiated by depressing hand lever 65 (Fig. 3);

(b) Bag filling and weighing stage—(Figs. 2 and 4);

(c) Gate closing stage—bag is filled and weighed (Fig. 5); and (d) Bag discharge stage (Fig. 6).

The gate opening stage is as follows:

At the outset the bag clamp 21 is lifted and the machine is ready for the application of a bag. The latter is applied to the spout 20 and hand lever 65 is momentarily depressed. The parts of the apparatus at this point are as shown in Fig. 3. Pump motor 42 and impeller 31 are continuously in operation throughout the various stages of the operation of the apparatus as a whole. The momentary pressure upon hand lever 65 opens the switch 59 thereby temporarily de-energizing the solenoid valve control 47 which thus directs fluid under pressure to the lower chamber 39b of the power cylinder 39 to initiate the upward or primary stroke of the power means. Prior to this primary stroke the previously completed secondary stroke, to be described later, had lifted the weight to its uppermost position as shown in Fig. 6 thereby urging the spout 20 through its second stage of movement, above defined, to its secondary position out of register with the throat 32.

Consequently, the initial portion of the primary stroke must accomplish an easing or lowering of the weight to its lowermost or unbalanced position wherein the limit stop adjustment screw 15 (Fig. 2) on the scale beam 10 contacts the lower limit screw 17.

When pressure is removed from the upper chamber 39a by interconnecting same to the exhaust reservoir via valve 47, which occurs at the outset of the primary stroke, there is no longer any fluid under pressure which, through the piston rod 69 and bell crank 70, urges the weight to its lifted or uppermost position. Consequently, there is a tendency for the weight to fall rapidly to its unbalanced position and an upward thrust is communicated to the piston 40 which urges it strongly in this direction. However, this upward thrust is restrained by the action of the cushion orifice 49 which permits only a small fluid flow to the chamber 39b thus invoking the assistance of atmospheric pressure upon the upper surfaces of piston 40 or a vacuum action within chamber 39b which eases the weight to its unbalanced position as shown in Fig. 2.

Concurrent with the lowering of the weight the spout 20 is moved into register with the orifice 33 of throat 32, and as the piston 40 moves up, the clamp 21 is lowered into clamping relation with the bag by virtue of the lifting of pin 69a out of engagement with bell crank lever 113 thus lowering lever 111 and permitting gravity to pull the bag clamp down.

During the upward movement of said piston 40 a gate opening thrust is communicated to gate 38 through the linkage consisting of arm 70c, link 77, bell crank 75 and hooking latch 78. The latter, having engaged the roller 79 upon the gate control rod 80, urges the gate open against the action of spring 83 by downwardly and axially shifting the rod 80. The linkage is so adjusted that the gate 38 is opened immediately after the clamp 21 has engaged the bag.

As the rod 80 is axially shifted downwardly the switch 62 is opened by the action of the pin 97 upon rod 80 which is lowered thus permitting lever 95 and rod 64 to drop. Thus the continuance of the primary stroke is assured in spite of the closing of switch 59 which normally will occur immediately after the depressing and releasing of hand lever 65. This is true because the cricuit 57, 58 of the solenoid valve control 47 will remain open until later closed by an opposite axial shift of rod 80.

After the gate is opened the cocking linkage is effective to pull the roller 87 into engagement with the latch 84. Thereafter additional counterclockwise movement of bell crank lever 75 causes the hook 78 to be disengaged from roller 79 thereby leaving the latch 84 as the sole means for retaining the gate 38 in an open position. The above disengagement is accomplished by the cooperation of limit stop 78a with the portion 78b of hook 78.

The bag discharge finger 102 is moved to an active position by means of an axial thrust to the right, as viewed in Fig. 3, which is communicated to the bag discharge rod 99 by means of arm 98 concurrent with the above described steps. As rod 99 moves to the right the finger 102 collides with arm 25a, yieldingly clears same, and thereafter snaps into an operative position under the action of spring 103.

At this point the piston 40 has reached the limit of its primary or upward stroke and stops. The arm 70b has shifted to a point as shown in Fig. 4 where roller 72 is out of engagement with the weight.

During this upward movement the fluid in the upper chamber 39a was exhausted to tank 44 via conduit 52, check valve 53 and exhaust conduit 54. A very small quantity of fluid may exhaust through the flow control valve 51.

When the primary stroke has ceased by reason of the piston 40 reaching the extremity of cylinder 39, no additional fluid may flow to the chamber 39b. Consequently, the pressure of fluid in conduit 45 becomes great enough to overcome the relief valve 55 and fluid is pumped back to the tank or reservoir 44 via conduit 56. However, fluid under pressure continues to urge the piston 40 upwardly.

This constitutes the end of the first or gate opening stage of operation.

Figure 5:
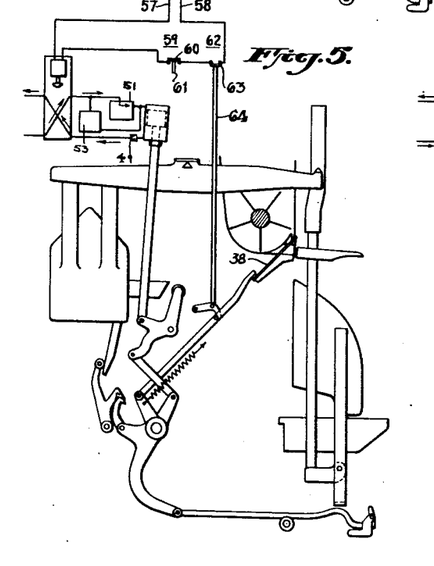

During the second or bag filling and weighing stage (Figs. 2 and 4) the impeller 31 forces material through the throat 32 and spout 20 into the bag until the weight of the bag and its contents counterbalances the weight 12, at which point a weighing movement of the weighing device occurs and the spout undergoes its first stage of movement in response to movement of weight 12 from an unbalanced to a balanced condition. The spout is thus moved through its first stage to its primary position in which it is partially out of register with the throat orifice 33 as shown in Fig. 5. The weighing movement of weight 12 marks the termination of this stage of operation by tripping the gate latch 84 by means of the upward movement of weight release arm 92 which cooperates with latch release arm 93.

During the gate closing stage the spring 83 strongly urges the gate control rod 80 upwardly to close the gate 38 substantially simultaneously with said weighing movement. As rod 80 shifts axially the secondary or downward stroke of the power means is initiated by the closing of the switch 62, which since the beginning of the gate opening stage has been open. The closing of this switch is accomplished through pin 97 on rod 80 striking the arm 95 and urging it in a counterclockwise direction as viewed in Fig. 5 whereby the switch arm 64 is raised to close switch 62 and thus to energize the solenoid valve control member 47. The energization of solenoid member 47 marks the changing of direction of fluid under pump pressure from the lower chamber 39b to the upper chamber 39a as indicated by arrows in Fig. 5. Thus the secondary power stroke is commenced. Fluid under pump pressure is directed to chamber 39a through the flow control valve 51.

At this point the bag discharge stage is inaugurated during which said secondary or downward power stroke is effective to accomplish the following in the order given:

(1) The spout 20 is moved from its primary or balanced position partly out of register with throat 32 to a lower or secondary position completely out of register therewith. This is accomplished by means of a thrust from piston 40 being communicated to arm 70b of bell crank lever 70 to urge the latter in a counterclockwise direction whereby roller 72 engages the beveled edge 73a of arm 73 and moves weight 12 upward to its uppermost position. Spout 20 is thus lowered at such a time that any blow back or puff of dust-laden air due to back pressure in the bag is thoroughly carried away by the suction in chamber 34.

(2) The bag clamp 21 is lifted by the action of pin 69a on piston rod 69 engaging the clamp lifting linkage comprising lever 113, rod 114 and lever 111.

(3) The bag is thereafter discharged as follows: Rod 69 by urging bell crank lever 70 in a counterclockwise direction communicates an ejecting thrust to the left, as viewed in Fig. 6, to the rod 99 and discharge finger 102. This is by the intermediary of link 77, lever 75 and arm 98. Thus finger 102 is thrust against arm 25a and the saddle is tipped to discharge the bag. Finger 102 is moved sufficiently to clear arm 25a whereby the latter swings back under force of gravity in a counterclockwise direction to its normal position.

As bell crank lever 75 is shifted in a clockwise direction during this stage of the operation, the cocking hook 78 is moved into engagement with roller 79 and thereby the cocking linkage is prepared for the ensuing primary stroke of the power means.

By the action of the flow control valve 51 only a small flow of fluid may be permitted to act upon the top surface of piston 40 in chamber 39a. Thus the duration of the secondary power stroke may be controlled whereby a predeterminable period may be interposed between:
(1) The closing of gate 38;
(2) The lifting of weight 12 and the lowering of spout 20; and
(3) The discharge of the bag.

It is possible to lift the bag clamp at any time between the closing of the gate 38 and the discharge of the bag.

SUMMARY OF OPERATION

I. Bag Filling and Weighing

*(Primary or upward power stroke of piston 40)*

(1) Prior to the primary power stroke of piston 40 the weight 12 is in its uppermost position, fluid pressure is on the top of piston 40, clamp 21 is open, bag saddle 24 is empty, and gate 38 is closed (Fig. 6).

(2) A bag is placed on spout 20.

(3) Lever 65 is depressed momentarily, interrupting valve control circuit 57, 58.

(4) Fluid pressure is thus directed to lower chamber 39b (Fig. 3) of cylinder 39 and the following occurs (primary power stroke):

(a) Piston rod 69 moves up;

(b) Bag clamp 21 is lowered to clamp bag;

(c) Cushion orifice 49 (Fig. 3) slows down the motion of rod 69 and this eases weight 12 down to its unbalanced position;

(d) As rod 69 moves up, the gate 38 is opened and latched in open position by latch 84 (Fig. 4);

(e) Discharge rod 99 is moved to an actuatable position, as shown in Fig. 2, from which it may be moved to tip saddle;

(f) Valve control circuit 57, 58 is interrupted at switch 62; and (g) Piston 40 moves to end of cylinder and stops.

II. Spout Lowering and Bag Discharge

*(Secondary or downward stroke of piston 40)*

(1) When the bag is filled weight 12 is counterbalanced and moves up in its first stage of movement and spout 20 moves downward in its first stage of movement partly out of register with throat. Latch 84 is tripped by weight arm 92 and gate 38 is closed (Fig. 5). As gate 38 closes rod 80 pushes rod 64 upward thus closing valve control circuit 57, 58 and initiating the secondary stroke.

(2) Fluid is thus directed to top of cylinder 39 and the following occurs (secondary power stroke):

(a) Weight 12 is moved up and frame 13 down by slow action of rod 69 and arm 70b as timed by flow control valve 51 (Fig. 6); spout 20 is thus lowered substantially fully out of register with throat 32;

(b) Clamp 21 is lifted by linkage 69a, 113, 114, 111;

(c) Hook 78 is moved into hooking position for engaging roller 79; and (d) Discharge rod 99 is pulled to left (Fig. 6), saddle 24 is tipped by finger 102, and bag is discharged.

While the invention has been described with respect to certain preferred examples which have given satisfactory results, it will be understood by those skilled in the art, after understanding the invention, that various changes and modifications may be made without departing from the spirit and scope of the invention, and it is intended therefore in the appended claims to cover all such changes and modifications.

What is claimed as new and desired to be secured by Letters Patent is:

1. In apparatus of the class described, a weighing device, a spout mounted on said weighing device, a bag saddle for holding a bag in filling relation with said spout, a gate for governing a flow of material through said spout, a fluid actuatable power cylinder having a piston operable to perform a power stroke divided into a first part and a second part, manually operable means for initiating the first part of said stroke, an operative interconnection between said gate and said piston for opening said gate in response to the first part of the power stroke means responsive to weighing movement of said weighing device for closing said gate, a bag discharge device responsive to the second part of the power stroke of the piston for discharging said bag, and a governor for controlling a flow of fluid to said power cylinder for controlling the duration and speed of the second part of the power stroke thereof whereby a predeterminable time interval is interposed between the closing of said gate and the discharge of the bag.

2. In apparatus of the class described, a weighing device, a spout mounted on said weighing device, a bag saddle for holding a bag in filling relation with said spout, a gate for governing a flow of material through said spout, a fluid actuatable power cylinder having a piston operable with a primary power stroke and a secondary power stroke, manually operable means for initiating said primary stroke, a gate control device responsive to said primary stroke for opening said gate, means responsive to weighing movement of the weighing device for closing said gate and for initiating said secondary power stroke, a bag discharger responsive to said secondary power stroke for discharging said bag, and an adjustable governor device for controlling a flow of fluid to said power cylinder for governing the duration of said secondary power stroke whereby a predeterminable time interval is interposed between the closing of said gate and the discharge of said bag.

3. In a valve bag weighing and filling apparatus, the combination comprising, a weighing device, a bag frame mounted on said device, a spout mounted on said frame and adapted for registering with a filler throat when in filling position, a suction chamber surrounding that portion of the spout adjacent the throat, a clamp for holding a bag upon said spout, a bag saddle pivotally mounted upon the frame and adapted to hold a bag in filling relation to the spout, means for feeding material through the spout into the bag, a gate for shutting off the flow of said material, a bag ejector, an hydraulic power device for said apparatus having a primary and a secondary power stroke, manually operable means for initiating said primary stroke, mechanism operatively associated with the power device for opening said gate on the primary power stroke, means for closing said gate in response to weighing movement of the weighing device, said spout moving partly out of register with said throat in response to said weighing movement, an operative interconnection between said gate and said power device for initiating said secondary power stroke in response to closing movement of said gate, means for operatively interconnecting said power device and said spout and operable in response to the secondary power stroke of such device for urging said spout further downwardly through a preselected distance for moving same substantially farther out of register with said throat, a bag clamp release device for lifting the bag clamp in response to said secondary power stroke, an operative interconnection between said bag ejector and said power device for thereafter actuating said bag ejector in response to the secondary power stroke, and an adjustable governor for controlling the flow of fluid to said power device for governing the duration of the secondary power stroke of said power device.

4. In a bag weighing and filling machine, the combination with a weighing device, of a hopper having a filler throat, a spout having an inlet orifice adapted for registering with the throat during filling of a bag, the inlet orifice moving partially out of register with the throat in response to weighing movement of said device, power means, bag discharge means, said power means being operatively connected to said spout for urging same out of register with said throat in response to said weighing movement, said power means also being operatively connected to said bag discharge means, a suction chamber surrounding the adjacent orifices of said throat and spout, and means for arresting the flow of material through said spout in response to weighing movement of said weighing device, said power means including a timer operatively connected thereto for delaying the operation thereof a preselected time after such weighing movement thereby to delay the actuation of said bag discharge means to discharge a bag from the filling machine a preselected time after such weighing movement.

5. In a valve bag weighing and filling apparatus, the combination comprising a weighing device, a bag frame mounted upon said device, a spout mounted on said frame adapted to engage the valve of a bag, a bag saddle pivotally mounted upon said bag frame and adapted for holding a bag in filling relation to the spout, a bag clamp for holding a bag on said spout, gate means for shutting off a flow of material to the bag through said spout, a gate closing device for urging said gate to a closed position, a latch for latching said gate in an open position, a bag ejector positioned for engaging said bag saddle and tilting same about the pivot thereof for discharging a bag, an hydraulic control cylinder having a piston and rod adapted for making a primary power stroke in one direction and a secondary power stroke in the opposite direction, manually operable means for initiating said primary power stroke, mechanism operatively associated with said rod for moving said gate to an open latched position on the primary power stroke thereof, a gate release device operatively associated with said weighing device for releasing the gate from a latched position in response to weighing movement of said device, an operative interconnection between said gate and said hydraulic cylinder for initiating said secondary power stroke in response to closing movement of the gate, a bag frame thrusting device operatively associated with said piston rod for thrusting said bag frame downwardly on said secondary power stroke a distance in excess of the distance moved during said weighing movement, a bag clamp release device operatively associated with said piston rod and operable immediately after said bag frame has been thrust downwardly for lifting said bag clamp, and a bag ejector actuator operatively associated with said piston rod and operable on said secondary power stroke for actuating said ejector after said clamp has been lifted.

6. In a valve bag weighing and filling apparatus, the combination comprising, a weighing device, a bag frame mounted upon said weighing device, a spout mounted on said frame, a bag clamp operatively associated with said spout, a bag saddle pivotally mounted upon said bag frame and adapted for holding the bag in filling relation with said spout, a feed throat member having a throat adapted for registering with said spout prior to weighing movement of said weighing device, a suction chamber surrounding the adjacent extremities of the throat and spout, said bag frame being constructed and arranged for weighing movement under the influence of the weight of said bag and contents and also being constructed and arranged for further movement whereby said spout is moved substantially completely out of register with the throat and the extremity of said spout is exposed to the suction chamber, a gate for controlling a flow of material through said throat member, means for urging said gate to a closed position, a latch for latching said gate in an open position, an hydraulic control cylinder having a piston and rod adapted for a primary power stroke in one direction and a secondary power stroke in the opposite direction, manually operable means for initiating said primary power stroke, means operatively associated with the rod for urging said gate to an open latched position and actuating said clamp in response to the primary stroke of the rod, a latch release device responsive to weighing movement of said weighing device for releasing said latch for said gate, an operative interconnection between said gate and said hydraulic cylinder responsive to the closing movement of said gate for initiating the secondary power stroke of the piston, a frame thrusting device operatively associated with the rod for thrusting said bag frame through said further movement during the initial portion of the secondary power stroke, a bag clamp lift device immediately operable thereafter in response to the secondary power stroke for lifting and releasing said bag clamp, a bag ejector operatively associated with the piston rod and operable after the lifting of said clamp for discharging the bag during a latter portion of the secondary power stroke, and a governor for restricting a flow of fluid to said cylinder whereby said secondary stroke may be adjusted to a predetermined period.

7. In apparatus of the class described, a weighing device, a bag spout mounted on said device, a gate for governing a flow of material through said spout, a power cylinder having a fluid actuatable piston, a valve for controlling a flow of fluid to the extremities of said cylinder for actuating the piston, electrical means for governing said valve, a manually operable switch for controlling said electrical means, a cushion orifice member interposed between said valve and one extremity of said cylinder, a flow control valve interposed between said valve and the opposite extremity of said cylinder, check valved by-pass means around said flow control valve for permitting exhaust flow only, means responsive to movement of said piston for opening said gate, means responsive to weighing movement of said weighing device for closing said gate, means responsive to said weighing movement for initiating further movement of said piston, and means responsive to the further movement of said piston for discharging said bag, said flow control means being effective to delay the discharge of said bag a predetermined time after the closing of said gate.

8. In a valve bag weighing and filling apparatus, the combination comprising, a weighing device including a scale beam, a bag frame mounted upon one side of said scale beam, a weight movable between upper and lower limits and mounted upon the opposite side of said scale beam, a spout mounted on said frame and adapted for registering with a filler throat when in filling position, a suction chamber surrounding adjacent extremities of said spout and throat, a bag saddle pivotally mounted upon said frame, a fluid actuatable power cylinder having a piston therein adapted for making a primary stroke and a secondary stroke, manually operable means for initiating the primary stroke, weight-lifting means for urging said weight toward the upper limit of the motion thereof, a cushion device responsive to said primary stroke for slowly releasing said means for urging said weight to the upper limit of movement thereof whereby the weight is eased into an active position in response to movement of the piston in such primary stroke, material flow control means responsive to said primary stroke for commencing a feed of material to said bag through said spout, an operative interconnection between said weighing device and said material flow control means responsive to a weighing movement of said weighing device for cutting off said flow of material through said spout, such weighing movement constituting a first stage of movement of said weighing device and weight, means responsive to such weighing movement and operatively connected with said power cylinder for initiating the secondary stroke thereof, said weight-lifting means being responsive to such secondary stroke for urging said weight through a second stage of movement thereof whereby the weight is lifted to the upper limit of motion thereof and said spout is thus moved downwardly out of register with the filler throat, a bag discharge device operable after the second stage of movement of said weight has been accomplished for discharging said bag in response to such secondary stroke, and a power cylinder governor for controlling the period of such secondary stroke, said governor being so constructed and arranged that a predetermined delay occurs between the shutting off of said flow of material and the discharge of the bag.

9. In apparatus of the class described, the combination with a weighing device having a bag frame and a filling spout operatively associated therewith, of a throat member adapted for registering with the spout when the latter is in a filling position, a bag saddle mounted upon the bag frame and adapted for holding a bag in filling position upon the spout, said weighing device being adapted for movement through a first stage to a primary position wherein said throat and spout are moved partially out of register and for movement through a second stage to a secondary position wherein said throat and spout are moved substantially fully out of register, a fluid actuatable power cylinder having a piston therein adapted for a primary stroke and a secondary stroke, weighing device moving means responsive to said secondary stroke for urging said weighing device through the second stage of movement thereof to such secondary position, manually operable means for initiating the primary stroke, a cushion device operatively associated with said cylinder and responsive to the primary stroke of the piston for easing said weighing device from such secondary position into an initial position from which weighing movement may occur, means responsive to the primary stroke of the piston for initiating a flow of material through the spout to the valve bag mounted thereon, means responsive to weighing movement of said weighing device for shutting off said flow of material to said spout, means operatively connected to said cylinder and responsive to such weighing movement for initiating the secondary stroke of the piston, said weighing device moving means now becoming effective in response to the secondary stroke for moving said weighing device to such secondary position, a bag discharge device effective thereafter in response to the piston secondary stroke for discharging the bag, and fluid flow control means operatively associated with said cylinder for governing the period of such primary and secondary strokes whereby a predetermined time interval is interposed between the weighing movement of said weighing device and the discharge of said bag.

10. In a bag weighing and filling machine, the combination comprising, a weighing device having a spout operatively associated therewith, a bag saddle adapted for holding a bag in filling relation with the spout, a throat member adapted for fully registering with the spout prior to a first stage movement of said weighing device, said weighing device being adapted for such first stage movement in response to a predetermined weight in said bag whereby the spout moves partially out of register with said throat member, said weighing device also being adapted for a second stage of movement whereby the spout is moved substantially fully out of register with said throat member, a fluid actuatable cylinder having a piston therein, a flow control valve operatively associated with one extremity of said cylinder, a cushion valve operatively associated with the opposite extremity of said cylinder, a master control valve for governing a flow of fluid under pressure to one or the other extremity of said cylinder whereby a primary stroke is produced by pressure upon one side of the piston and a secondary stroke is produced by pressure on the other side of the piston, manually operable means for actuating said master control valve to initiate such primary stroke, material feed control means for commencing a flow of material to said bag through said throat member and spout in response to such primary stroke, the latter means being responsive to the first stage of movement of said weighing device for shutting off said flow of material, a power cylinder actuator responsive to the first stage of movement of said weighing device for governing said master control valve whereby the primary stroke is terminated and the secondary stroke is initiated, means for operatively interconnecting said piston and said weighing device and responsive to such secondary stroke for urging said weighing device through the secondary stage of movement thereof and a bag ejector for ejecting said bag thereafter in response to such secondary stroke.

11. In apparatus of the class described, the combination comprising, a weighing device movable from an unbalanced position to a primary position in response to a predetermined weight thereupon and to a secondary position in response to an external force, a spout mounted upon said weighing device, a bag saddle operatively associated with said device and adapted for holding a valve bag in filling position upon said spout, a filler throat member adapted for registering with said spout during the filling of said bag prior to the movement of said weighing device to such secondary position, a vacuum chamber surrounding the adjacent extremities of said throat member and spout, a gate governing the flow of material to the bag, a fluid actuatable power device having a movable power member, manually operable means for initiating the operation of said power device, weight-moving means responsive to the movement of said power member for applying said external force to urge said weighing device to such secondary position whereby said spout member is moved substantially out of register with said throat member, means for controlling the movement of the power member whereby said weighing device is eased from such secondary position to a position from which weighing movement may occur, gate control means responsive to movement of the power member for opening said gate, the latter means being responsive to movement of said weighing device to the primary position for closing said gate, said weight-moving means being operative after said gate has been closed for urging said weighing device to the secondary position in response to movement of the power member, a bag discharge device, means for operatively interconnecting the latter device and said power member for actuating such bag discharge device after said power member has urged said weighing device to the secondary position, and control means for said power device for governing the period of movement of the power member for interposing a predeterminable delay between the time of movement of said weighing device to such secondary position and the discharge of said bag.

12. A bag filling and weighing machine having, in combination, a weighing device, a spout mounted upon said weighing device, a bag saddle adapted for holding a bag in filling position upon said spout, said weighing device being adapted for movement from an initial position to a primary position in response to normal weighing movement thereof and to a secondary position, a suction chamber member operatively associated with said spout, an extremity of said spout being partially exposed to the suction of said suction chamber member when the weighing device is in such primary position and being fully exposed to such suction when the weighing device is in the secondary position, a fluid actuatable power cylinder having a piston adapted for a primary stroke and a secondary stroke, manually operable means for initiating the primary stroke, fluid flow control means for controlling the movement of the piston during at least a portion of the primary stroke thereof, a material flow control device operatively associated with the piston for commencing a flow of material to said spout in response to such primary stroke of the piston, the latter device being responsive to weighing movement of said weighing device to the primary position thereof for shutting off the flow of material to said spout, a power cylinder actuator responsive to weighing movement of the weighing device for initiating the secondary stroke of the piston, means responsive to the secondary stroke for urging said weighing device to said secondary position and holding same therein, a bag discharge device also responsive to such secondary stroke and effective after the latter is complete thereafter for discharging said bag, and a power cylinder governor for controlling the duration of the secondary stroke whereby a predetermined interval is interposed between the time said weighing device reaches its secondary position and the time of discharge of the bag, said fluid flow control means being effective to ease said weighing device into its initial position when the primary stroke of the piston is reinitiated.

13. In a bag filling and weighing machine, the combination with a scale beam having a weight and a bag frame associated therewith, of a filling spout, a filling throat member having an orifice adapted for registering with said spout during a filling operation, a suction chamber surrounding adjacent extremities of said throat member and spout, a bag saddle for supporting a valved bag in filling relationship with said spout, the weight and spout being adapted to move to a primary position in response to weighing movement thereof whereby said spout is moved partially out of register with the orifice, means for arresting the flow of material through said filling throat member in response to such weighing movement, power means operative in response to said weighing movement for urging said weight to a secondary position whereby the spout is moved substantially fully out of register with the orifice bag discharge means, means for operatively interconnecting said bag discharge means and said power means enabling the latter to actuate the former, said power means having operatively connected thereto a retarding mechanism for slowing the operation of the power means commencing with the actuation thereof in response to said weighing movement thereby delaying the actuation of said bag discharge means a preselected time after the occurrence of such weighing movement.

14. In a bag filling and weighing apparatus, the combination with a weighing device, of a spout mounted upon said weighing device, a bag saddle pivotally mounted upon said device and adapted for holding a bag in filling position on said spout, an hydraulic power cylinder having a piston operable with a primary stroke in one direction and a secondary stroke in the opposite direction, a power cylinder actuator for initiating the primary stroke, a material flow control device responsive to the primary stroke for commencing a flow of material through said spout, said latter device being responsive to weighing movement of said weighing device for shutting off the flow of material and initiating the secondary power stroke of the piston, means for discharging said bag in response to and during the latter portion of the secondary power stroke, and fluid flow control means for prolonging said secondary stroke by a predetermined period.

15. In apparatus of the class described, a weighing device, a filler throat member having an orifice, a spout mounted on said device and mounted for movement into and out of register with such orifice, a bag clamp operatively associated with the spout, a power cylinder having a fluid actuatable piston, a solenoid valve for governing fluid flow to said cylinder, an electric circuit for governing said solenoid valve, manually operable means for opening and closing said circuit, a cushion orifice member interposed between said solenoid valve and one extremity of said cylinder, a fluid flow control valve interposed between said solenoid valve and the opposite extremity of said cylinder, a by-pass conduit for said fluid flow control valve, a check valve in said by-pass conduit adapted for permitting exhaust flow only, means for actuating said bag clamp in response to movement of said piston, means for starting a flow of material through said spout in response to movement of the piston, means for shutting off such flow of material in response to weighing movement of said weighing device, means responsive to said weighing movement for initiating further movement of said piston, means operable thereafter in response to said further movement of the piston for moving said spout out of register with the throat member orifice, means operable thereafter in response to movement of the piston for lifting said clamp, and means operable thereafter for discharging a bag on said spout in response to movement of the piston.

WILLIAM R. PETERSON.

REFERENCES CITED

The following references are of record in the file of this patent:

UNITED STATES PATENTS

| Number | Name | Date |
|---|---|---|
| 1,071,385 | Bates | Aug. 26, 1913 |
| 1,861,443 | Holzapfel | June 7, 1932 |
| 2,009,408 | Middleboe | July 30, 1935 |
| 2,060,011 | Andreas | Nov. 10, 1936 |
| 2,097,551 | Garlinghouse | Nov. 2, 1937 |
| 2,350,529 | Peterson | June 6, 1944 |